United States Patent
Bowker et al.

(10) Patent No.: US 6,601,071 B1
(45) Date of Patent: Jul. 29, 2003

(54) METHOD AND SYSTEM FOR BUSINESS TO BUSINESS DATA INTERCHANGE USING XML

(75) Inventors: Michael Bowker, Cupertino, CA (US); Craig B. Yappert, Gilroy, CA (US); Vivek Sharma, San Francisco, CA (US)

(73) Assignee: Oracle International Corp., Redwood Shores, CA (US)

( * ) Notice: Subject to any disclaimer, the term of this patent is extended or adjusted under 35 U.S.C. 154(b) by 0 days.

(21) Appl. No.: 09/550,300

(22) Filed: Apr. 14, 2000

Related U.S. Application Data
(60) Provisional application No. 60/147,213, filed on Aug. 4, 1999.

(51) Int. Cl.[7] .............................................. G06F 17/00
(52) U.S. Cl. ..................... 707/102; 707/100; 707/104.1
(58) Field of Search ....................... 703/22, 13; 707/10, 707/501.1, 513, 102, 100, 104.1

(56) References Cited

U.S. PATENT DOCUMENTS

| | | | |
|---|---|---|---|
| 5,909,570 A | * 6/1999 | Webber | ......................... 703/13 |
| 6,418,400 B1 | * 7/2002 | Webber | ......................... 703/22 |

OTHER PUBLICATIONS

"Infoteria Announces iConnector and iMessenger Availability of English Version Empowers Rapid XML–Based Solution Development Worldwide", Dec. 8, 1999, Newswire, p7132.*

Exner et al., "Examining XML:New Concepts and Possibilities in Web Authoring", Nov. 1998, Computers Libraries, vol. 18, No. 10, Nov./Dec. 1998.*

Gurin, "IT supply chain initiative gaining momentum: RosettaNet continues development of e–commerce interoperability standards", Apr. 1999, Automatic I.D. News, v. 15, No. 4, p. 42(1).*

Hickey, "XML adds structure", Jan. 11, 1999, Traffic World, v. 257, No. 2, p. 34.*

* cited by examiner

*Primary Examiner*—Jean M. Corrielus
*Assistant Examiner*—Gwen Liang
(74) *Attorney, Agent, or Firm*—Hickman Palermo Truong & Becker LLP; Brian D. Hickman

(57) ABSTRACT

A system allows exchange of information by converting it to/from proprietary formats from/to XML. An XML import tool may be used to import data from an XML file into a target repository by receiving user input for selecting data structures within the target repository, for selecting set of fields that belong to the selected set of data structures, and for mapping fields in the selected set of fields to tags associated with data within the XML file. A set of commands is generated based on the user inputs for populating the one or more fields that are mapped to tags with the data in the XML file. The set of commands cause the one or more fields that are mapped to tags to be populated with the data in the XML file.

28 Claims, 8 Drawing Sheets

| | | | |
|---|---|---|---|
| Host | concrete.us.ora | Login | otnm |
| Port | 1521 | Password | **** |
| Sid | ILOG | | |

◆ Build New Query
◇ Use pre-built query from directory: /home/otnora/vsharma

[Next >]

FIG. 1

In this page you select one or more tables that you want to use in your query.

| All Tables | | Selected Tables |
|---|---|---|
| ABC<br>ADMIN<br>ADMINISTRATOR<br>ADMIN_APPS<br>ADMIN_TO_APPS<br>ADMVIEW<br>AD_PARTNER_DETAILS<br>CBT<br>COUNTRY_REGION<br>DEBUG | >><br>><br><<br><< | CBT<br>COUNTRY_REGION |

[Next >]

FIG. 2

In this page you specify the association amongst the tables in your query.

Join

▦ — 302

| COUNTRY_REGION.ID ☐ | COMPARISON ☐ | COUNTRY_REGION.ID ☐ |

☐ Not

[Add] [Undo] [Clear All]

Operators
[And] [Or]

Subqueries
[Start] [End]

Your query (do not edit this text area)

|

[Next >]

FIG. 3

In this page you select the fields that you want to see in the output.
☐ Show Count Only   402                                              404

| All Fields ▦ | | Selected Fields |

CBT.ID
CBT.NAME
CBT.PART_NUMBER
COUNTRY_REGION.ID
COUNTRY_REGION.REGION_ID
COUNTRY_REGION.COUNTRY_NAME

[>>]
[>]
[<]
[<<]

CBT.PART_NUMBER
COUNTRY_REGION.REGION_ID
COUNTRY_REGION.COUNTRY_NAME

■ Show unique records only
☐ Sort results by    CBT.ID ☐

[Next >]

FIG. 4

In this form you can specify conditions to restrict the results returned by your query.

| Condition |
|---|
| ⊞—502 |
| [COUNTRY_REGION.ID ☐] [COMPARISON ☐] ─┬◇ [             ] |
|                                                                                                                                      └◇ [COUNTRY_REGION.ID ☐] |
| ☐ Match case         ☐ Not |
| [Add] [Undo] [Clear All] |

| Operators | | Subqueries | |
|---|---|---|---|
| [And] | [Or] | [Start] | [End] |

Your query (do not edit this text area)

```
|COUNTRY_REGION.ID > 22
```

[Next >]

You specify the type of output you want in this page.

◇ HTML

◆ XML (DEFAULT)

◇ XML (CUSTOM)

◇ MAIL GENERATOR

◇ ASCII

◇ CSV

| Output Destination |
|---|
| ◇ Another HTML Page |
| ◆ File in (server) directory   [|/odt/d9/odp/out.6298] |

[Next >]

FIG. 6

In this page you specify the format of the output. 700

Top Tag |<Reg|Kits>|  Row Tag |<Kit|>|

| Column Name | Tag |
|---|---|
| COUNTRY_REGION.COUNTRY_NAME | \|<COUNTRY_REGION.COUN |
| COUNTRY_REGION.REGION_ID | \|<COUNTRY_REGION.REGI |
| CBT.PART_NUMBER | \|<CBT.PART_NUMBER> |

Next >

800

Database/XML File  XML
Step 1 of 4                              2
                                         Db XML File location  |/home/vsharma/gen11.xml|

| | | | |
|---|---|---|---|
| Host | concrete.us.ora | Login | otnm |
| Port | 1521 | Password | **** |
| Sid | ILOG | | |

Next

FIG. 10

Tables & Sequences
Step 2 of 4

XML → Db

Database Layout

Tables
- ABC
- ADMIN
- ADMINISTRATOR
- ADMIN_APPS
- ADMIN_TO_APPS
- ADMVIEW

Sequences
- ADMINISTRATOR_SEQ
- ADMIN_APPS_SEQ
- ADMIN_SEQ
- ADMIN_TO_APPS_SEQ
- CBT_SEQ
- COUNTRY_REGION_SEQ

XML File Layout

OTNMembers
  Member
    FIRST_NAME
    LAST_NAME
    LOGIN
    EMAIL

Next

Field Values
Step 3a/b of 4

XML 2 Db

Gathering information for table: CBT

| *ID | Text Field | | |
|---|---|---|---|
| *NAME | XML Tags | FIRST_NAME | |
| *PART_NUMBER | Foreign Key | COUNTRY_REGION.REGION_ID | | of records created in this table: 1

Next

FIG. 11

Field Values
Step 3b/b of 4

XML 2 Db

Gathering information for table: COUNTRY_REGION

| *ID | Sequence | CBT_SEQ |
|---|---|---|
| *REGION ID | Text Field | |
| *COUNTRY NAME | Text Field | | of records created in this table: 1

Next

FIG. 12

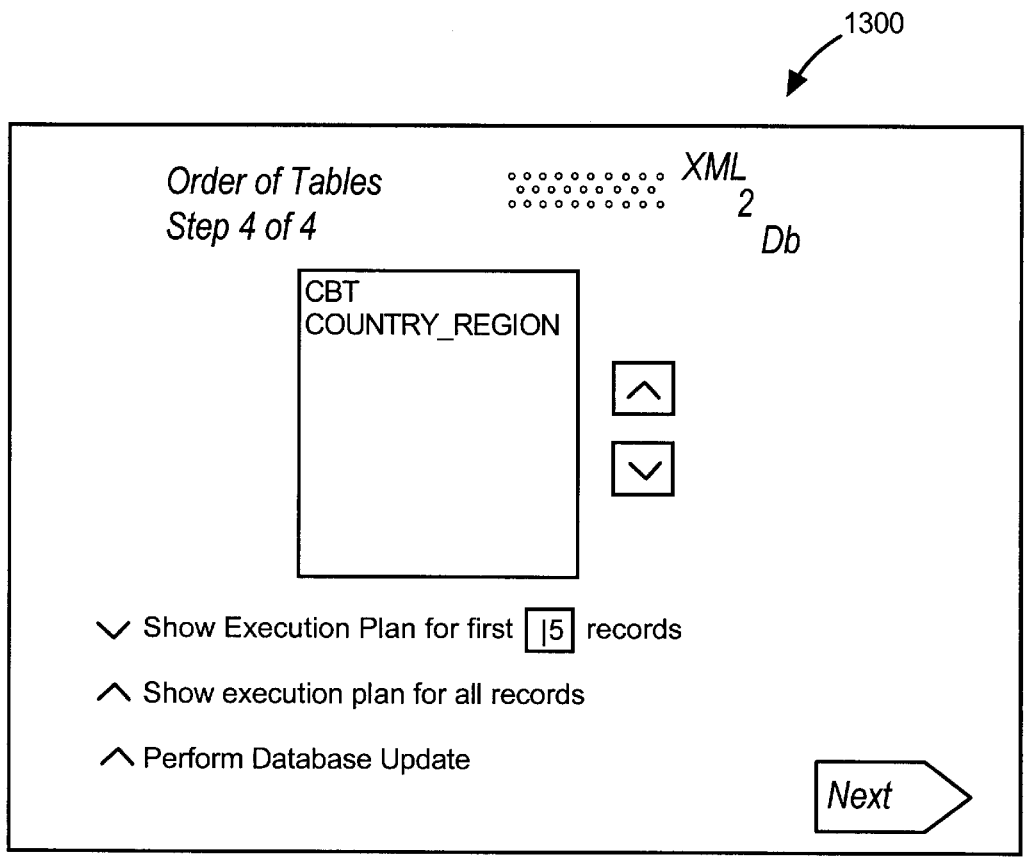

FIG. 13

```
select CBT_SEQ.NEXTVAL from DUAL: (Storing in COUNTRY_REGION.ID_O)

insert into CBT( ID ,NAME ,PART_NUMBER )
values ( '' ,'Michael ' ,FKEY:COUNTRY_REGION.REGION_ID );

insert into COUNTRY_REGION( ID, REGION_ID, COUNTRY_NAME )
values ( COUNTRY_REGION.ID_O ,'' ,'' );
```

```
select CBT_SEQ.NEXTVAL from DUAL; (Storing in COUNTRY_REGION.ID_O)

insert into CBT( ID ,NAME , PART_NUMBER )
values ( '' ,'MARCELO ' ,FKEY:COUNTRY_REGION.REGION_ID );

insert into COUNTRY_REGION( ID, REGION_ID, COUNTRY_NAME )
values ( COUNTRY_REGION.ID_O ,'' ,'' );
```

FIG. 14

METHOD AND SYSTEM FOR BUSINESS TO BUSINESS DATA INTERCHANGE USING XML

RELATED APPLICATION; PRIORITY CLAIM

This patent application claims priority from U.S. Provisional Application No. 60/147,213, entitled "METHOD AND SYSTEM FOR BUSINESS TO BUSINESS DATA INTERCHANGE USING XML," filed Aug. 4, 1999 by MICHAEL BOWKER, CRAIG B. YAPPERT and VIVEK SHARMA, the contents of which are incorporated herein by reference in their entirety.

FIELD OF THE INVENTION

The present invention relates to computer systems and, more specifically, to a method and system for business to business data interchange using XML.

BACKGROUND OF THE INVENTION

Traditionally, for businesses to exchange information electronically, the businesses have to agree on the format of the information that is to be exchanged. For example, two hospitals that desire to exchange patient information may decide that the exchange format will include the following fields:

First Name
Last Name
Address1
Address2
Phone Number
Social Security Number

Internally, each business may store the information in a different format than the agreed-upon exchange format, based on their specific data organization needs. For example, a hospital H1 may store patient information in the following fields:

First Name
Last Name
Street Address
City
State
Zip Code
Social Security Number

Each company that adopts an internal format that is different than the exchange format typically has to develop a tool for converting the data from their format to the exchange format, and from the exchange format to their format. In the example given above, hospital H1 would have to develop a tool that merged data from the City, State, and Zip Code fields to create a value for the Address2 field, and a tool that parsed the value of the Address2 field to generate separate values for the City, State, and Zip Code fields.

The development of such tools may involve a significant amount of overhead. However, when the conversion is only between two formats, the cost of developing the tools may be outweighed by the benefit that each business derives from being able to store the data in a format dictated by its own needs.

Unfortunately, it is difficult to impose a standard exchange format on an entire industry, much less to get all industries to adopt a single standard exchange format. For example, even if all hospitals in the world agree on the exchange format to be used for patient information, the medical supply industry may adopt a different exchange format. Consequently, for a hospital to communicate electronically both with hospitals and with medical supply sources, the hospital would have to develop a tool for converting data between their format and the hospital exchange format, and another tool for converting between their format and the medical supply industry exchange format.

As a practical matter, it is often impossible for a business to accurately anticipate all of the exchange formats that will be required by the businesses with which the given business will want to exchange information. For example, a hospital may need to talk to medicine suppliers, instrument suppliers, banks and so on. Writing a new tool is normally an expensive process, so having to write one for every type of business would soon prove too costly. Thus, even if all of the exchange formats are known, the cost of developing conversion tools to support all of them may be enormous.

Based on the foregoing, it is clearly desirable to provide a mechanism that allows businesses to exchange information without having to know, and provide separate conversion tools for, the formats of the businesses with which they exchange electronic information.

SUMMARY OF THE INVENTION

Techniques and tools are provided for allowing businesses to exchange data efficiently without designing special tools for each exchange format. According to one aspect of the invention, techniques are provided for importing data from an XML file into a target repository, including:

receiving a first set of user input that selects a selected set of data structures within the target repository;

receiving a second set of user input that selects a selected set of fields that belong to the selected set of data structures;

receiving a third set of user input that maps one or more fields in the selected set of fields to tags associated with data within the XML file;

generating a set of commands based on the first, second and third sets of user input, wherein the set of commands includes commands for populating the one or more fields that are mapped to tags with the data in the XML file that is associated with the tags; and issuing the set of commands to cause the one or more fields that are mapped to tags to be populated with the data in the XML file that is associated with the tags.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates a screen for specifying a source database from which data is to be exported;

FIG. 2 illustrates a screen for selecting tables from a source database;

FIG. 3 illustrates a screen for specifying associations between selected tables;

FIG. 4 illustrates a screen for selecting fields from the selected tables;

FIG. 5 illustrates a screen for specifying conditions to limit row selection;

FIG. 6 illustrates a screen for specifying the type of output file to which data is to be exported;

FIG. 9 illustrates a screen for specifying a target database for receiving data from the selected XML file;

FIG. 10 illustrates a screen for selecting tables and sequences in the target database;

FIG. 11 illustrates a screen for associating selected fields of a selected table with text, XML tags, sequences, or foreign key columns;

FIG. 12 illustrates a screen for associating selected fields of a different selected table with text, XML tags, sequences, or foreign key columns;

FIG. 13 illustrates a screen for specifying the order in which selected tables are populated;

FIG. 14 illustrates a screen that shows an exemplary execution plan; and

DETAILED DESCRIPTION OF THE PREFERRED EMBODIMENT

Figures 7, 8:
FIG. 7 illustrates a screen for assigning tags to be used in the XML file to which data is to be exported.
FIG. 8 illustrates a screen for specifying an XML file to import into a target database.

Techniques are described for exchanging electronic information. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

Techniques are provided for using eXtensible Markup Language ("XML") for facilitating data interchange among disparate sources. The XML language is described in detail at www.oasis-open.org/cover/xml.html#contents and at the sites listed there. In general, the XML language includes tags that name fields and mark the beginnings and ends of fields, and values for those fields.

In general, a system is provided that allows exchange of information by converting it to/from proprietary formats from/to XML. For the purpose of explanation, it shall be assumed that both the source and the target of an exchange are database systems. However, the system and techniques may be used to exchange data between any types of software applications. The system is generic in that it assumes nothing about the layouts used by the source or target databases in any exchange, nor how the tables in those databases are organized.

According to one embodiment, an "XML export tool" is provided to generate XML from the source database, and an "XML import tool" is provided to graphically import XML generated by any source into a target database. In particular, the XML import tool is used for mapping the XML data to a database schema and its fields. This approach can easily be extended to other data storage systems.

In one embodiment, both tools are web based and can be accessed from any machine that has access to the web server on which they are installed. The tool may be implemented, for example, using Java, JDBC, Javascript and HTML.

The system described herein solves the hospital-to-hospital problem described above, and also the hospital-to-any-and any-to-hospital problem, without having the need to write and maintain a new tool for each of them. It also ensures that if there is a new type of business with which the hospital has to interact, no extra effort will have to be spent on developing specialized tools.

XML Export Tool

The XML export tool is used for reading data from a source database and rendering it in an XML file. The XML export tool, also referred to herein as Internet Query Tool or "IQTool", is a graphical tool which helps users gain information about the source database as they are building a query to extract data from the source database. The query used to extract data from the source database is referred to herein as the "extraction query". Using the XML export tool, data can be extracted and put in a file in XML format by following these steps:

1) Specify database parameters
2) Choose tables/views from which to extract data
3) Establish relationship between the tables
4) Optionally, specify conditions to limit the returned records
5) Choose XML as the output format and specify the file in which output should be written
6) Specify the tags that should be written corresponding to each field, for a row and for the entire document These steps are illustrated in FIGS. 1 through 7, which depict a sequence of user interface screens presented by the XML export tool. Referring to FIG. 1, it depicts a user interface screen 100 that allows a user to specify the parameters of the database from which the user wants to extract data. In FIG. 1, data is being extracted from a database residing on a host "concrete.us.oracle.com" with SID ILOG, running on Port 1521. The schema with Login=otnm is being accessed.

The screen 100 shown in FIG. 1 has an option for the user to build an extraction query, or to use an extraction query that has already been built. For the purpose of illustration, it shall be assumed that the user is building a new extraction query. After entering the specified information into the screen 100, the "next" button is selected to advance to the next screen of the XML export tool.

FIG. 2 illustrates the screen 200 presented to the user in response to the user pressing the Next button in the screen 100. The screen 200 provides controls that allow the user to select the tables that the user wants to use in the query. The XML export tool constructs the list of tables by logging on to the source database using the information entered in the screen 100, and by issuing a database command to retrieve information about the schema of the source database.

In the illustrated example, two tables, CBT and COUN-TRY$_{13}$ REGION, have been selected from the list of tables in the source database. The small window 202 on the side of "All Tables" label provides a help function. Specifically, when window 202 is selected, details are displayed about the table last selected. The details thus displayed include names and datatypes of the fields in the table.

After selecting the appropriate tables using screen 200, the user activates the Next button to proceed to screen 300, illustrated in FIG. 3. Screen 200 provides controls that allow the user to specify relationships amongst the selected tables. The user can add as many relationships as the user desires. Through these controls, the user can establish foreign key relationships between the tables.

The small window 302 above the first select list provides a help function. If a user selects window 302, a list of all foreign key relationships for the tables selected are displayed to the user. There is an automatic join calculator in this new window. It can help user calculate the foreign key relationship if the user is not sure. A foreign key relationship is a database concept that determines the relationship between tables. A foreign key relationship is used for joining records from two or more tables to present one consolidated record. The automatic join calculator studies all tables that are part of the query and examines their foreign keys. The automatic join calculator then generates an SQL sub-statement that performs a logical join of the tables.

Selecting the Next button on screen 300 results in the generation of screen 400 shown in FIG. 4. Screen 400 is used to select the fields of the selected tables that contain the data that is going to be exported. A first list 402 contains all the fields of the tables that the user has selected. The user can choose one or more of these fields to appear in the output. The fields that the user has chosen appear in the list 404 on the right side. The user can further decide whether to include only unique records in the output, and may specify a particular order in which to sort the results.

Selecting the Next button of screen 400 results in the generation of screen 500 shown in FIG. 5. Screen 500 provides controls that allow the user to specify conditions to restrict the results that are returned by the extraction query. The helper window 502 of screen 500 allows the user to view the first "n" values of any field to help the user make a more informed decision in building the query. The user can do case-sensitive or case-insensitive queries which contain CHAR, DATE or NUMERIC type fields.

Selecting the Next button of screen 500 causes the generation of screen 600, illustrated in FIG. 6. Screen 600 provides controls that allow the user to decide the format of the output. In addition to XML, the tool allows users to print in several different formats including HTML, ASCII and Comma Separated Value format ("CSV"). Selection of the XML (default) option instructs the tool to generate a default XML file. Selection of the default XML file option causes the generation of an XML file in which each output field is enclosed in a tag, and where there is no hierarchy within a record. Selection of custom XML allows a user to tailor the output XML file. In particular, selection of custom XML allows users to create XML output with arbitrary tags and any level of hierarchy within a record. A user may also specify the name of the output file in this step.

Selection of the Next button on screen 600 when custom XML is the selected option causes generation of screen 700, shown in FIG. 7. According to one embodiment, screen 700 is the last screen presented in the data exportation process. With screen 700, the user specifies the tags of the output XML file. The user can specify a top tag (the super enclosing tag), a Row tag (which is applied to each row), and can specify names of the tags that will enclose each output field. Once the user has specified the tags and presses the Next button, an XML file is created. The XML file thus created has the tags that the user specified and contains data from the extraction query that the user built in the previous steps. For example, a sample file produced using the XML export tool may include:

```
<?xml version="1.0"?>
<OTNMembers>
    <Member>
        <FIRST_NAME>Craig</FIRST_NAME>
        <LAST_NAME>Yappert</LAST_NAME>
    </Member>
```

-continued

```
    <Member>
        <FIRST_NAME>Michael</FIRST_NAME>
        <LAST_NAME>Bowker</LAST_NAME>
    </Member>
    <Member>
        <FIRST_NAME>Vivek</FIRST_NAME>
        <LAST_NAME>Sharma</LAST_NAME>
    </Member>
</OTNMembers>
```

XML Import Tool

The XML Import Tool is used for reading an XML file and storing its contents in a target database. According to one embodiment, the XML Import Tool is web based tool that provides a graphical interface that can be used for establishing a relationship amongst the fields in the XML file and the fields of the target database. A typical use of the XML Import Tool is illustrated in sequence of screens shown in FIGS. 8–14, which shall now be described.

FIG. 8 illustrates the first screen 800 displayed by the XML Import Tool, according to an embodiment of the invention. Screen 800 provides controls that allow a user to specify the XML file from which data needs to be read. Preferably, the file resides on the same machine as the machine that is running the web server, and where the XML import tool is installed.

Selecting the OK button on screen 800 causes the generation of screen 900, illustrated in FIG. 9. Screen 900 includes controls that allow the user to specify the parameters of target database. Typically, these are the same types of parameters that were entered in screen 100 of the XML export tool, and include the hostname, port, sid, login and password of the user.

In response to selection of the Next button on screen 900, the XML import tool logs on to the specified target database, and issues one or more queries to retrieve information about the layout of the target database, and the sequences that have been defined within the target database. The information thus retrieved is used to populate the lists of screen 1000, illustrated in FIG. 10.

Screen 1000 is divided into two sections. The right hand side of screen 1000 shows the layout of the XML file that the user has selected. The XML file layout is shown on screen 1000 for reference purposes only. The left side of screen 1000 shows a list of tables in the schema of the target database, and a list of sequences in that schema. User can select as many tables and sequences as the user desires. The selected tables and sequences will be used in the later steps for establishing the relationship between the XML tags and the fields within the target database.

Selecting the Next button of screen 1000 produces screen 1100, illustrated in FIG. 11. Screen 1100 corresponds to the table CBT that was selected using screen 1000. A screen similar to screen 1100 is presented to the user for each selected table. Screen 1100 is divided into three sections. The first column 1102 shows all the fields of the table. An asterisk next to the field indicates that it cannot be NULL. The field name is shown as link. If the user clicks on the field name, more information about the field is displayed to the user. For example, selecting the link associated with a field may cause the display of the first "n" values of the field and the datatype of the field.

The second column is a list 1104 that includes controls that allow a user to specify what type of value goes into the corresponding field. In the illustrated embodiment, the user can choose among four types of values: TextField, XML Tags, Foreign Key, and Sequence. Selection of the TextField option indicates that the corresponding field in each imported record will be populated with a specific text value. As shall be described hereafter, the specific text value is specified by the user of the XML import tool, and does not come from the XML file.

Selection of the XML Tags option indicates that the corresponding field in each imported record will be populated with values associated with a particular tag in the XML file.

Selection of the Foreign Key option indicates that the corresponding field in each imported record will be populated with the value of the field to which the selected foreign key points.

Selection of the Sequence option indicates that the corresponding field in each imported record will be populated with the next value of the sequence that has been selected. Sequences are database objects that work as counters. A sequence returns a numeric value every time it is called, where the returned numeric value is unique relative to numeric values previously returned by the sequence.

In the third column 1106, the user specifies the actual value (or the source of the actual values) to be imported into the corresponding field. This column 1106 is sensitive to the selection made in the corresponding row of the second column 1104. Thus, if the user chose TextField in the second column, a text dialog box will appear in the third column. If the user chose XML Tags in the second column 1104, a list of all the XML tags in the input XML file will appear in a select list in the third column 1106. Similarly if the user chose Foreign Key in the second column 1104, a list of foreign keys will be displayed. If Sequence is chosen in the second column 1104, a list of sequences will come up in the third column 1106.

According to one embodiment, the XML import tool tries to make intelligent guesses based on the names and types of the fields. For example, if a field displayed in column 1102 has a name that matches the name of an XML tag (partial match or full match), the XML import tool sets the default value of the second column 1104 to XML Tags and displays the corresponding XML tag as the default in the third column 1106. These calculated guesses help to reduce the work that must be performed by the user in any given import operation. If the guessed value is not what the user wants, the user can change it.

Similarly, the XML import tool tries to match foreign keys and sequences. To match foreign keys and sequences, the XML import tool compares names of the fields in each table with the names of the foreign keys and sequences determined by it prior to the generation of screen 1100. If a field in column 1102 does not match any XML tag, sequence, or foreign key, then the corresponding entry in column 1104 defaults to TextField.

Screen 1100 also allows a user to specify the creation of multiple records in one table based on a single record in the XML file. The user can specify how many records are to be added to the table using the small input box 1108.

For example, assume that the target database has a telecom table in which are stored numbers for phone, fax and any other telecom types. For example, such a table may be defined to have the following two fields:

CODE VARCHAR2(100)—which contains the number
TYPE VARCHAR2(100)—which indicates what type it is like EMAIL, PHONE Assume that a single record in the XML file includes both phone and email tags:

<Phone>650-506-7000</Phone>
<Email>abc@oracle.com</Email>

In this case the XML file contains two telecom addresses for the same "person" record in the XML file, and the two addresses need to go into the target table as two separate records. In this example, the user can cause this to happen by specifying the number 2 in the "# of records . . . " box 1108. As a result, the XML import tool presents an additional screen which, according to one embodiment, looks similar to screen 1100. In the first screen, the phone XML tag is mapped to the target table. In the second screen, the Email XML tag is mapped to the target table. While the foregoing example creates two records in a target table based on each XML record, the technique is not limited to the creation of any particular number of table records per XML record.

In the example given above, two tables were selected using screen 1000. Screen 1100 is generated for receiving mapping instructions relating to the first table, and screen 1200 illustrated in FIG. 12 is generated for receiving mapping instructions relating to the second table. The step of presenting a screen for receiving mapping instruction is repeated for each table specified in screen 1000. After all of the mapping screens have been completed for each selected target table, the XML import tool generates screen 1300, illustrated in FIG. 13.

Screen 1300 provides controls that allow the user to change the order of tables in which data is inserted. For some database designs the ability to specify the order in which to populate tables is critical. For example, table A may be dependent on table B (foreign key relationship). Thus, a user cannot insert something in table A before the user creates the corresponding entry in table B. Screen 1300 allows user to specify that table B should be populated before table A.

Screen 1300 also provides controls that allow the user to specify the next action. In the illustrated embodiment, the user may either (1) see the execution plan for "n" records, (2) see the execution plan for all records, or (3) do the actual update. The execution plan is the set of commands that will be issued to the target database to import the data from the XML file into the tables and fields to which they have been mapped. In the illustrated example, the target database is supports the SQL database language. Consequently, the execution plan includes a series of SQL statements. Screen 1400 of FIG. 14 shows a series of SQL statements that may be presented to the user in response to the user's request to see the execution plan.

Benefits and Variations

Using the tools described herein, electronic data exchange between businesses is facilitated. Specifically, in any given exchange, the business providing the data does not have to know the format expected by the business receiving the data. The data provider simply exports the data into an XML file. The data recipient can then use the XML import tool to easily map the XML fields to the appropriate fields in its schema, and import the data. Thus, without prior negotiation or standardization of formats, many businesses can efficiently exchange electronic information with each other while continuing to maintain their own data in whatever format, organization, and repository types that they deem best for their own business needs.

While embodiments have been described in which both the source and target of the exchange are relational databases, the techniques described herein are not limited to such embodiments. For example, the source accessed by the XML export tool may be any type of data repository, or the output of any type of program. Similarly, the target accessed by the XML import tool may be any type of data repository, or the input to any type of program. Thus, the nature of the commands sent by the XML export tool to the source, and of the commands sent by the XML import tool to the target, will vary from implementation to implementation.

Hardware Overview

Figure 15:
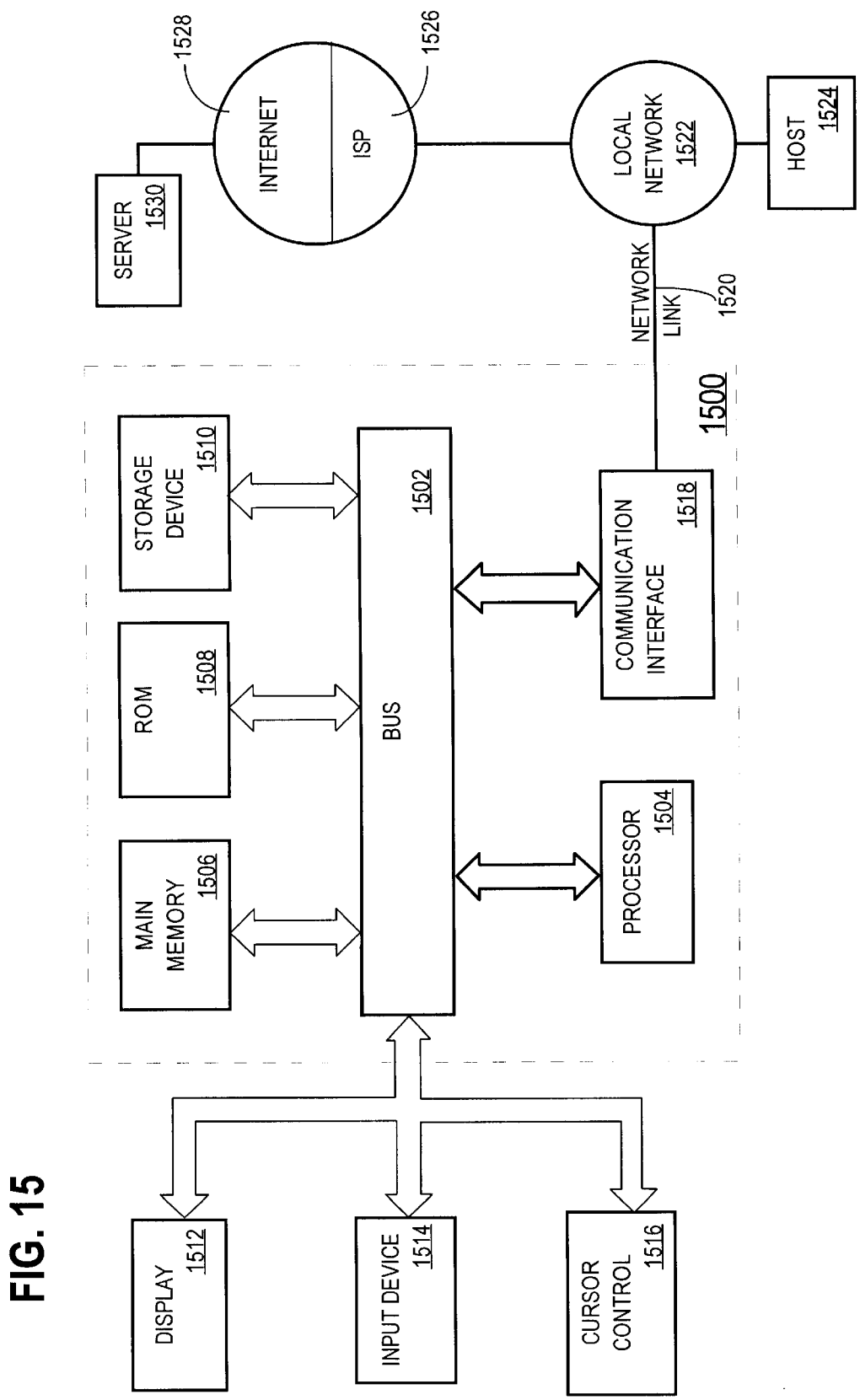
FIG. 15 is a block diagram that illustrates a computer on which an embodiment of the invention may be implemented.

FIG. 15 is a block diagram that illustrates a computer system 1500 upon which an embodiment of the invention may be implemented. Computer system 1500 includes a bus 1502 or other communication mechanism for communicating information, and a processor 1504 coupled with bus 1502 for processing information. Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

The invention is related to the use of computer system 1500 for implementing the techniques described herein. According to one embodiment of the invention, those techniques are implemented by computer system 1500 in response to processor 1504 executing one or more sequences of one or more instructions contained in main memory 1506. Such instructions may be read into main memory 1506 from another computer-readable medium, such as storage device 1510. Execution of the sequences of instructions contained in main memory 1506 causes processor 1504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1504 for execution. Such a medium may take many forms, including but not limited to, non-volatile media, volatile media, and transmission media. Non-volatile media includes, for example, optical or magnetic disks, such as storage device 1510. Volatile media includes dynamic memory, such as main memory 1506. Transmission media includes coaxial cables, copper wire and fiber optics, including the wires that comprise bus 1502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1504 for execution. For example, the instructions may initially be carried on a magnetic disk of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are exemplary forms of carrier waves transporting the information.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518. In accordance with the invention, one such downloaded application implements the techniques described herein.

The received code may be executed by processor 1504 as it is received, and/or stored in storage device 1510, or other non-volatile storage for later execution. In this manner, computer system 1500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method for importing data from an XML file into a target repository, the method comprising the steps of:
   receiving a first set of user input that selects a selected set of data structures within the target repository;
   receiving a second set of user input that selects a selected set of fields that belong to said selected set of data structures;
   receiving a third set of user input that maps one or more fields in said selected set of fields to tags associated with data within said XML file;
   generating a set of commands based on said first, second and third sets of user input, wherein said set of commands includes commands for populating the one or more fields that are mapped to tags with the data in the XML file that is associated with the tags; and
   issuing said set of commands to cause the one or more fields that are mapped to tags to be populated with the data in the XML file that is associated with the tags.

2. The method of claim 1 wherein the step of receiving a third set of user input includes receiving user input that maps a plurality of distinct tags within a single record of said XML file to a single field within a particular data structure.

3. The method of claim 1 wherein:
   the target repository is a database; and
   the step of receiving a first set of user input that selects a selected set of data structures within the target repository includes receiving user input that selects tables within said database.

4. The method of claim 3 wherein the step of receiving a second set of user input that selects a selected set of fields that belong to said selected set of data structures includes receiving user input that selects columns within said tables.

5. The method of claim 1 further comprising the steps of:
   receiving a fourth set of user input that maps one or more fields in said selected set of fields to sequences within said target repository; and
   wherein the step of generating a set of commands includes generating commands for populating the one or more fields that are mapped to sequences with values dictated by the sequences.

6. The method of claim 1 further comprising the steps of:
   receiving a fourth set of user input that maps one or more fields in said selected set of fields to foreign key fields within said target repository; and
   wherein the step of generating a set of commands includes generating commands for populating the one or more fields that are mapped to foreign key fields with values dictated by the foreign key fields.

7. The method of claim 1 further comprising the steps of:
   receiving a fourth set of user input that maps one or more fields in said selected set of fields to user-specified text values; and
   wherein the step of generating a set of commands includes generating commands for populating the one or more fields that are mapped to user-specified text values with said user-specified text values.

8. The method of claim 1 further comprising the step of displaying a screen that includes controls for receiving said third set of user input, said screen including controls for displaying data that identifies selected fields and corresponding controls for displaying data that identifies XML tags to be mapped to said selected fields.

9. The method of claim 1 further comprising the step of, prior to receiving said third set of user input, automatically establishing an initial mapping between one or more fields and one or more XML tags based on a matching operation performed between data associated with said one or more fields and data associated with said one or more XML tags.

10. The method of claim 9 wherein said matching operation is performed between identifiers of said one or more fields and identifiers for said one or more XML tags.

11. The method of claim 5 further comprising the step of, prior to receiving said fourth set of user input, automatically establishing an initial mapping between one or more fields and one or more sequences based on a matching operation performed between data associated with said one or more fields and data associated with said one or more sequences.

12. The method of claim 6 further comprising the step of, prior to receiving said fourth set of user input, automatically establishing an initial mapping between one or more fields and one or more foreign key fields based on a matching operation performed between data associated with said one or more fields and data associated with said one or more foreign key fields.

13. The method of claim 1 further comprising the step of generating said XML file from a source repository that has a schema that is different from said target repository.

14. The method of claim 1 wherein:
   the method further comprises the step of receiving a fourth set of user input that establishes an order to said selected set of data structures; and
   the step of generating a set of commands includes generating commands for populating the one or more fields of the selected set of data structures in a sequence based on said order.

15. A computer-readable medium bearing instructions for importing data from an XML file into a target repository, the instructions comprising instructions for performing the steps of:
   receiving a first set of user input that selects a selected set of data structures within the target repository;
   receiving a second set of user input that selects a selected set of fields that belong to said selected set of data structures;
   receiving a third set of user input that maps one or more fields in said selected set of fields to tags associated with data within said XML file;
   generating a set of commands based on said first, second and third sets of user input, wherein said set of commands includes commands for populating the one or more fields that are mapped to tags with the data in the XML file that is associated with the tags; and
   issuing said set of commands to cause the one or more fields that are mapped to tags to be populated with the data in the XML file that is associated with the tags.

16. The computer-readable medium of claim 15 wherein the step of receiving a third set of user input includes receiving user input that maps a plurality of distinct tags within a single record of said XML file to a single field within a particular data structure.

17. The computer-readable medium of claim 15 further comprising instructions for performing the steps of:

receiving a fourth set of user input that maps one or more fields in said selected set of fields to user-specified text values; and wherein the step of generating a set of commands includes generating commands for populating the one or more fields that are mapped to user-specified text values with said user-specified text values.

18. The computer-readable medium of claim 15 wherein:

the target repository is a database; and the step of receiving a first set of user input that selects a selected set of data structures within the target repository includes receiving user input that selects tables within said database.

19. The computer-readable medium of claim 18 wherein the step of receiving a second set of user input that selects a selected set of fields that belong to said selected set of data structures includes receiving user input that selects columns within said tables.

20. The computer-readable medium of claim 15 further comprising instructions for performing the steps of:

receiving a fourth set of user input that maps one or more fields in said selected set of fields to sequences within said target repository; and wherein the step of generating a set of commands includes generating commands for populating the one or more fields that are mapped to sequences with values dictated by the sequences.

21. The computer-readable medium of claim 15 further comprising instructions for performing the steps of:

receiving a fourth set of user input that maps one or more fields in said selected set of fields to foreign key fields within said target repository; and wherein the step of generating a set of commands includes generating commands for populating the one or more fields that are mapped to foreign key fields with values dictated by the foreign key fields.

22. The computer-readable medium of claim 15 further comprising instructions for performing the step of displaying a screen that includes controls for receiving said third set of user input, said screen including controls for displaying data that identifies selected fields and corresponding controls for displaying data that identifies XML tags to be mapped to said selected fields.

23. The computer-readable medium of claim 15 further comprising instructions for performing the step of, prior to receiving said third set of user input, automatically establishing an initial mapping between one or more fields and one or more XML tags based on a matching operation performed between data associated with said one or more fields and data associated with said one or more XML tags.

24. The computer-readable medium of claim 23 wherein said matching operation is performed between identifiers of said one or more fields and identifiers for said one or more XML tags.

25. The computer-readable medium of claim 20 further comprising instructions for performing the step of, prior to receiving said fourth set of user input, automatically establishing an initial mapping between one or more fields and one or more sequences based on a matching operation performed between data associated with said one or more fields and data associated with said one or more sequences.

26. The computer-readable medium of claim 21 further comprising instructions for performing the step of, prior to receiving said fourth set of user input, automatically establishing an initial mapping between one or more fields and one or more foreign key fields based on a matching operation performed between data associated with said one or more fields and data associated with said one or more foreign key fields.

27. The computer-readable medium of claim 15 further comprising instructions for performing the step of generating said XML file from a source repository that has a schema that is different from said target repository.

28. The computer-readable medium of claim 15 wherein:

the computer-readable medium further comprises instructions for performing the step of receiving a fourth set of user input that establishes an order to said selected set of data structures; and the step of generating a set of commands includes generating commands for populating the one or more fields of the selected set of data structures in a sequence based on said order.

\* \* \* \* \*